United States Patent
Krishnan

(10) Patent No.: US 9,607,457 B2
(45) Date of Patent: Mar. 28, 2017

(54) REUSEABLE KEYFOB FOR USE PRIOR TO SALE OF KEYLESS VEHICLE

(71) Applicant: FORD GLOBAL TECHNOLOGIES, LLC, Dearborn, MI (US)

(72) Inventor: Venkatesh Krishnan, Wayne, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 92 days.

(21) Appl. No.: 14/749,900

(22) Filed: Jun. 25, 2015

(65) Prior Publication Data

US 2016/0379424 A1    Dec. 29, 2016

(51) Int. Cl.
*B60R 25/24*    (2013.01)
*G07C 9/00*    (2006.01)

(52) U.S. Cl.
CPC ..... *G07C 9/00007* (2013.01); *G07C 9/00896* (2013.01); *G07C 2009/00984* (2013.01)

(58) Field of Classification Search
CPC .. G07C 2009/0042; G07C 2009/00428; G07C 2009/00476; G07C 2009/0092; B60R 25/24; B60R 25/243
USPC ............................................. 340/5.72; 702/2
See application file for complete search history.

(56) References Cited

U.S. PATENT DOCUMENTS

| | | | |
|---|---|---|---|
| 6,718,240 B1 | 4/2004 | Suda et al. | |
| 8,350,670 B2 | 1/2013 | Kelly et al. | |
| 2005/0199019 A1* | 9/2005 | Marcelle | E05B 47/0012 70/38 A |
| 2006/0232377 A1* | 10/2006 | Witkowski | G08C 19/28 340/5.25 |
| 2009/0132813 A1 | 5/2009 | Schibuk | |
| 2012/0268242 A1 | 10/2012 | Tieman et al. | |
| 2014/0188310 A1 | 7/2014 | Hatfield | |
| 2014/0266583 A1* | 9/2014 | Lopez | G07C 9/00857 340/5.26 |
| 2015/0356797 A1* | 12/2015 | McBride | G07C 9/00119 340/5.61 |
| 2016/0247339 A1* | 8/2016 | Miller | G07C 9/00007 |

* cited by examiner

*Primary Examiner* — Kevin Kim
(74) *Attorney, Agent, or Firm* — Jason Rogers; King & Schickli, PLLC

(57) ABSTRACT

A keyfob and related method of utilizing a keyfob prior to a sale of a new vehicle to a purchaser having a virtual keyfob are provided. The method broadly includes the steps of pairing a keyfob to a computer of the new vehicle at an assembly plant, using the keyfob to switch a mode of the new vehicle between an assembly mode and a transportation mode, and unpairing the keyfob from the computer upon pairing the computer to the virtual keyfob of the purchaser. The step of unpairing the keyfob may include providing instructions from a remote location to the computer via a wireless network, and from the computer to the virtual keyfob via a local area wireless network. The method may further include the step of re-pairing the keyfob to a computer of a second new vehicle at the first or a third location.

20 Claims, 4 Drawing Sheets

REUSEABLE KEYFOB FOR USE PRIOR TO SALE OF KEYLESS VEHICLE

TECHNICAL FIELD

This document relates generally to keyfobs used with keyless vehicles, and more specifically to a reuseable keyfob used prior to a purchaser, having a virtual keyfob, taking possession of the vehicle.

BACKGROUND

It is well known that keyfobs, with or without key blades, are widely used and enjoyed by vehicle owners. It is also well known that smartphones and similar devices are at least equally widely used and enjoyed by most vehicle owners. It is anticipated that future vehicles will utilize a mobile application, or app, stored and run on a smartphone as a virtual keyfob. Using a smartphone or similar device as a virtual keyfob eliminates the need for keyfobs which themselves have certain drawbacks. The primary drawback of present keyfobs is the cost of replacement or repair in the event the keyfob is lost or stolen, or in the event the keyfob ceases to function properly. Secondarily, keyfobs can be rather bulky to carry on one's person. Although smartphones are likewise often misplaced and are bulky to carry, the elimination of one of the two devices reduces the likelihood of misplacement and the amount of items one has to carry.

While replacing the keyfob with a virtual keyfob is desired by vehicle owners, the elimination of the keyfob creates some issues for vehicle manufacturers within the manufacturing, transportation, and selling processes. More specifically, the manufacturer must have a means of starting new vehicles during the manufacturing or assembly process in order to perform all necessary vehicle tests, including a driving test, prior to transporting the new vehicle to a dealership. During the transporting process, a need may arise to drive the vehicle a short distance during loading/unloading of a vehicle carrier. Once at the dealership, dealers must have a means of starting the new vehicle to allow prospective purchasers to test drive the vehicle. It is simply not feasible to use a different smartphone for each test drive. Even more, prospective purchasers will be reluctant to download an app to their smartphone solely to test drive a new vehicle.

Accordingly, a need exists for an inexpensive way for vehicle manufacturers to overcome issues related to the replacement of keyfobs with virtual keyfobs owned by prospective purchasers. Ideally, a keyfob having limited functionality in order to minimize cost could be utilized to provide the functionality needed throughout the manufacturing, transportation, and selling processes. More specifically, the keyfob would have to be paired with a specific new vehicle at the assembly location and unpaired from the new vehicle when the purchasers' virtual keyfob is paired to the new vehicle. Even more, it would be desirable if the keyfob were able to communicate with the new vehicle's computer to start the vehicle via a local area wireless network and with the manufacturer via a wireless network, and be able to switch between modes of operation including an assembly mode, a transportation mode, and a user mode.

SUMMARY OF THE INVENTION

In accordance with the purposes and benefits described herein, a method is provided of utilizing a keyfob prior to a sale of a new vehicle to a purchaser having a virtual keyfob. The method may be broadly described as comprising the steps of: pairing a keyfob to a computer of the new vehicle at an assembly plant; using said keyfob to switch a mode of the new vehicle between an assembly mode and a transportation mode; and unpairing the keyfob from the computer of the new vehicle upon pairing the computer of the new vehicle to the virtual keyfob of the purchaser.

In one possible embodiment, the method further includes the step of returning the keyfob to the assembly plant; and pairing the keyfob to a second computer of a second new vehicle at the assembly plant.

In another possible embodiment, the assembly mode limits at least one function of the new vehicle. In still another possible embodiment, the at least one function of the new vehicle limited in the assembly mode includes at least one of a maximum distance the new vehicle can be driven, a maximum speed the new vehicle can be driven, and operability of a remote start feature.

In yet another possible embodiment, the method further includes the step of switching the mode of the new vehicle, prior to shipping the new vehicle to a remote location, from the assembly mode to the transportation mode using the keyfob.

In still another possible embodiment, the transportation mode limits at least one function of the new vehicle. In another, the at least one function of the new vehicle limited in the transportation mode includes at least one of providing power to parking lights and enabling a trunk lid latch.

In one other possible embodiment, the method further includes the step of switching the mode of the new vehicle, upon arrival of the new vehicle at the remote location, from the transportation mode to the assembly mode using the keyfob.

In another possible embodiment, the step of unpairing the keyfob from the computer of the new vehicle includes the steps of authorizing the pairing of the computer of the new vehicle to the virtual keyfob of the purchaser, pairing the computer of the new vehicle to the virtual keyfob of the purchaser, and providing instructions to the computer of the new vehicle to execute the unpairing step.

In still another possible embodiment, the instructions in the step of providing instructions to the computer of the new vehicle include instructions to switch a mode of the new vehicle from an assembly or a transportation mode to a user mode wherein all functions of the new vehicle are available. In yet another possible embodiment, the instructions in the step of providing instructions to the computer of the new vehicle are provided from a second remote location to the new vehicle computer via a wireless network, and from the new vehicle computer to the virtual keyfob of the purchaser via a local area wireless network.

In a second possible embodiment, a method of utilizing a keyfob in association with a new vehicle prior to a purchaser, having a virtual keyfob, taking possession of the new vehicle, includes the steps of: pairing the keyfob to a computer of the new vehicle at a first location; transporting the new vehicle and the paired keyfob from the first location to a second location remote from the first location; and unpairing the keyfob from the computer of the new vehicle upon pairing the computer of the new vehicle to a virtual keyfob.

In another possible embodiment, the method further includes the steps of returning the keyfob to the first location or to a third location for pairing the keyfob to a second computer of a second new vehicle at the first or the third location.

In yet another possible embodiment, the method further includes the step of using said keyfob to switch a mode of the new vehicle between an assembly mode and a transportation mode.

In still another possible embodiment, the assembly mode limits select functions of the new vehicle. In another, the keyfob is used to switch the mode of the vehicle from the assembly mode to the transportation mode prior to transporting the new vehicle to the second location.

In another possible embodiment, the step of unpairing the keyfob from the computer of the new vehicle includes the steps of authorizing the pairing of the computer of the new vehicle to the virtual keyfob of the purchaser, pairing the computer of the new vehicle to the virtual keyfob of the purchaser, and providing instructions to the computer of the new vehicle to delink with the keyfob.

In one other possible embodiment, the step of providing instructions to the computer of the new vehicle includes instructions to switch a mode of the new vehicle from the assembly or the transportation mode to a user mode wherein all functions of the new vehicle are available. In yet another, the instructions are provided from a fourth location to the new vehicle computer via a wireless network, and from the new vehicle computer to the virtual keyfob of the purchaser via a local area wireless network.

In a third possible embodiment, a keyfob for use in association with a new vehicle prior to a purchaser, having a virtual keyfob, taking possession of the new vehicle, includes a housing containing a power source, and a transmitter; a mode select button supported by said housing for selecting a mode of operation of the new vehicle; and a processor programmed to pair the keyfob to a computer of the new vehicle at a first location, and unpair the keyfob from the computer of the new vehicle in response to the computer being paired with the virtual keyfob of the purchaser at a second location.

In the following description, there are shown and described several embodiments of a keyfob and related method of utilizing a keyfob in association with a new vehicle prior to a purchaser, having a virtual keyfob, taking possession of the new vehicle. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle and method and together with the description serve to explain certain principles thereof. In the drawing figures.

Reference will now be made in detail to the present preferred embodiments of the keyfob and related method of utilizing a keyfob in association with a new vehicle prior to a purchaser, having a virtual keyfob, taking possession of the new vehicle, examples of which are illustrated in the accompanying drawing figures, wherein like numerals are used to represent like elements.

DETAILED DESCRIPTION

Figure 1:
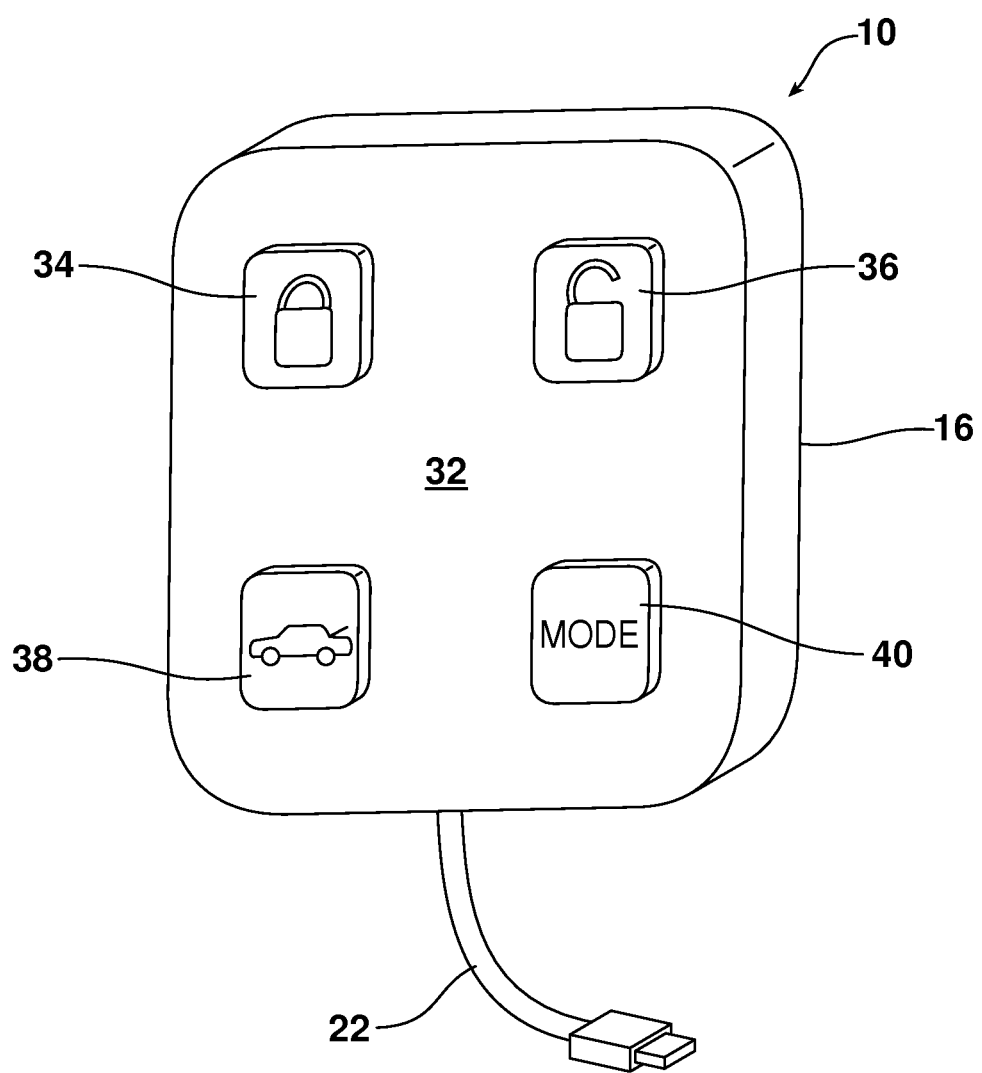
FIG. 1 is a is a front perspective view of a keyfob.
Figure 2:
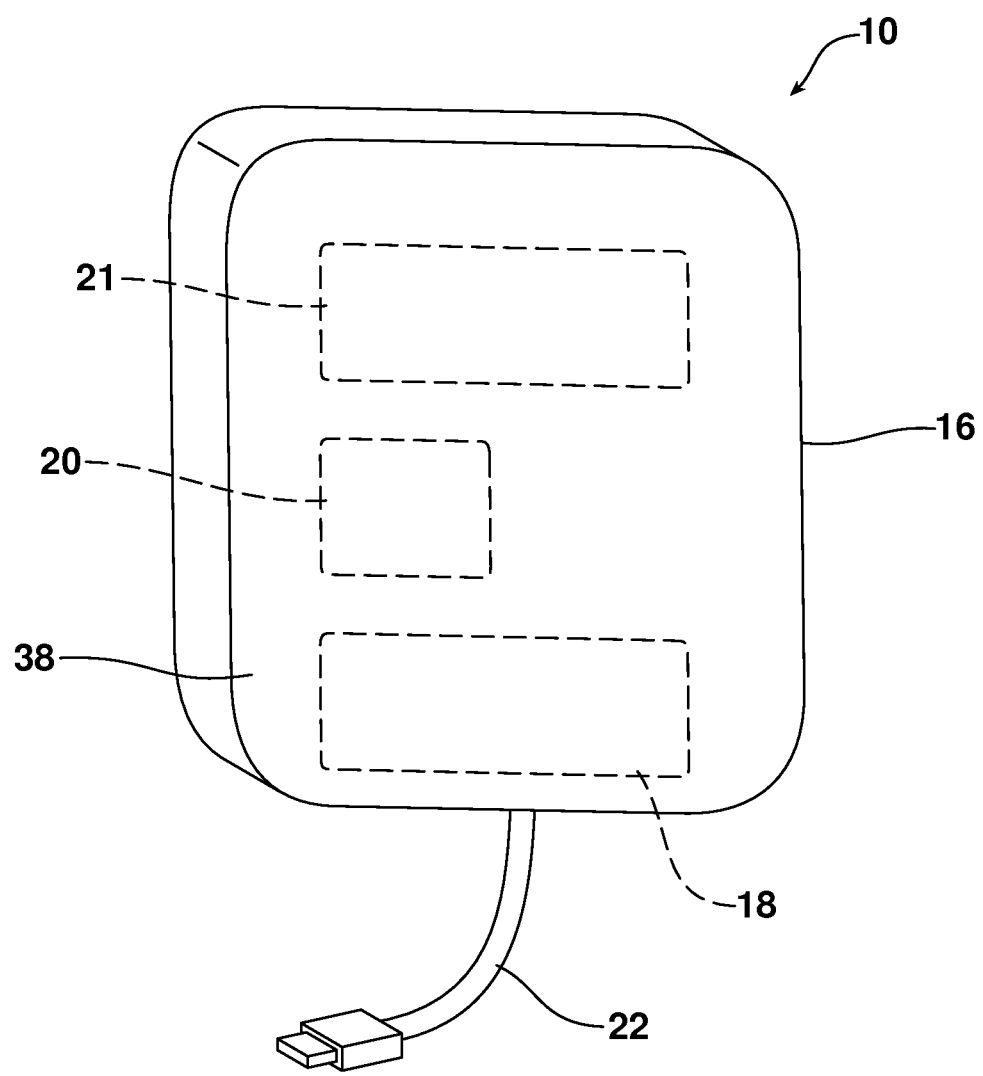
FIG. 2 is a is a rear perspective view of the keyfob.

Reference is now made to FIGS. 1 and 2 which together illustrate a keyfob 10 for use in association with a new vehicle 12 prior to a purchaser, having a virtual keyfob 14, taking possession of the new vehicle. The keyfob 10 includes an outer housing 16 containing a number of switches, a power source 18, a transmitter 20, a processor 21, and a communication cable 22. The power source 18 in the described embodiment is a rechargeable battery although other sources of power can be utilized including, for example, a replaceable battery. The communication cable 22 is a universal serial bus or USB cable, in the described embodiment, and extends from the keyfob 10 for use in recharging the battery 18. For example, the battery 18 of the keyfob 10 may be recharged by plugging the USB cable 22 into a mating USB port 24 in the new vehicle 12.

The transmitter 20 is provided primarily to communicate commands via processor 21 from the number of switches (e.g., a mode change command) to a computer 26 of the new vehicle, to pair the keyfob 10 to the computer at an assembly plant 28, and to unpair the keyfob from the computer when the computer is paired to the virtual keyfob 14 of the purchaser. In the described embodiment, the transmitter 20 communicates over a local area wireless network 30 (e.g., a Wi-Fi network) directly with the computer 26 or a vehicle control module via a Wi-Fi receiver 50 of the Wi-Fi network. In alternate embodiments, such communications could occur via normal keyfob radio control frequencies (~400 MHz) or near field or low energy communications. The transmitter 20 may be omitted in alternate embodiments or the keyfob could be equipped with a receiver and suitable antenna (e.g., a coil antenna) in addition to the transmitter.

In the described embodiment, the USB cable 22 may likewise be utilized to communicate commands via processor 21 from the number of switches (e.g., a mode change command) to the computer 26 of the new vehicle in the event of a malfunction or other limitation on use of the transmitter 20. Even more, the USB cable 22 could also be utilized to pair the keyfob 10 to the computer 26 at an assembly plant 28 and to unpair the keyfob from the computer when the computer is paired to the virtual keyfob 14 of the purchaser.

As best shown in FIG. 2, the number of switches includes four push button switches positioned on a front face 32 of the keyfob 10 in the described embodiment. Each switch of the number of switches includes a simple illustration indicating a function performed by depressing the switch. For instance, switch 34 displays a locked padlock indicating that pressing the switch will lock the new vehicle 12. Similarly, switch 36 displays an unlocked padlock indicating the switch is utilized to unlock the new vehicle 12. Switch 38 displays an open trunk lid indicating the switch is utilized to release a decklid latch (not shown) thereby opening the trunk lid of the new vehicle 12. Last, switch 40 displays the word "MODE" and is used to change a mode of the new vehicle 12 between an assembly mode and a transportation mode. Each of the switches signals the new vehicle computer 26 via the transmitter 20 or USB cable 22 as indicated above.

Figure 3:
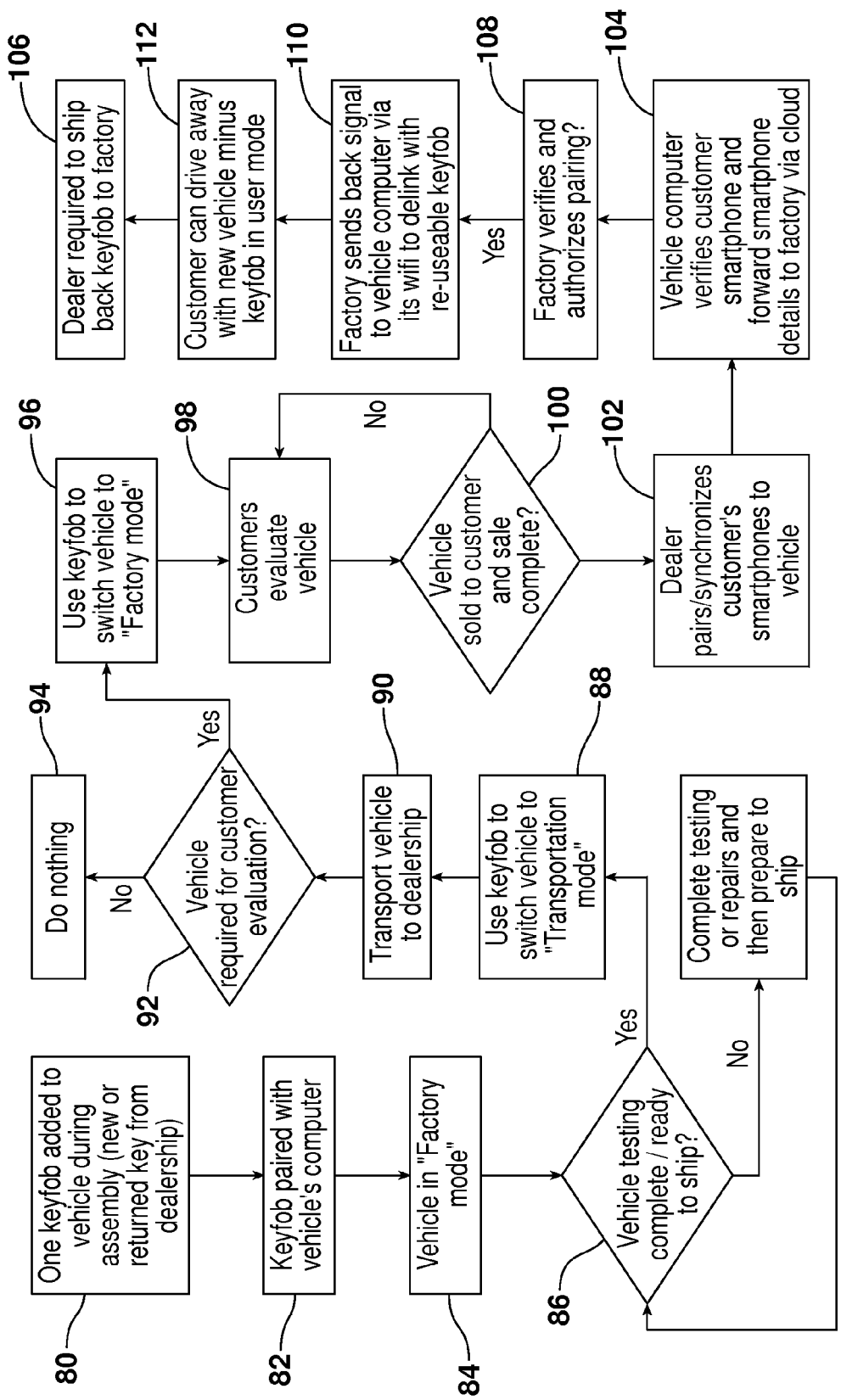
FIG. 3 is a flow chart schematic illustrating utilization of the keyfob in association with a new vehicle prior to a purchaser, having a virtual keyfob, taking possession of the new vehicle.

The steps utilized in the method of the described embodiment are described with reference to FIG. 3. FIG. 3 is a flowchart illustrating utilization of a keyfob 10 in association with a new vehicle 12 prior to a purchaser, having a virtual keyfob 14, taking possession of the new vehicle. At Step 80, a keyfob 10 added to a new vehicle 21 at a first location 42. In the described embodiment, the first location 42 is an assembly plant. In Step 82, the keyfob 10 is paired to the computer 26 of the new vehicle 12. As indicated above, the keyfob 10 is paired to the computer 26 via the transmitter 20 or by plugging the USB cable 22 into the USB port 24 in the new vehicle. In the described embodiment, the paired keyfob 10 remains with the new vehicle 12 throughout the assembly process.

The keyfob 10 is further utilized to place the computer 26 of the new vehicle 12 in an assembly mode at Step 84. In the assembly mode, certain functions of the new vehicle 12 may be limited while allowing the new vehicle to be tested. For example, a number of miles the new vehicle 12 can be driven may be limited, a maximum speed the vehicle can attain may be limited, and operability of a remote start feature may be disabled. It should be noted, however, that all testing of the new vehicle 12 typically conducted at an assembly plant can still be performed in the assembly mode. Even more, all keyfob-based functions that will be provided via the virtual keyfob 14 can likewise be performed in the assembly mode.

If the new vehicle 12 has completed testing at the assembly plant 42, including all of the electrical testing, as determined at Step 86, then the keyfob 10 is further utilized to place the computer 26 of the new vehicle in a transportation mode at Step 88. This step is typically achieved using electronic equipment at the assembly plant 42. Thus, use of the keyfob 10 will eliminate the need to connect the plant's equipment to each new vehicle at the end of the assembly process.

The transportation mode is generally used to decrease use of a vehicle battery 44 and to prevent battery drain during transportation from the first location 42 to a second, remote, location 46. In other words, assembly of the new vehicle 12 is completed at the first location 42 and the new vehicle is shipped to the second location 46. In the described embodiment, the second location 46 is a vehicle dealership but the second location could also be directly to a purchaser or to a fleet owner, such as, a rental car or a trucking company. In the transportation mode, certain functions of the new vehicle 12 may be limited in order to meet the above-referenced desire to limit battery use and to safeguard the new vehicle during transportation. For example, the parking lights may be electronically disconnected and the decklid latch may be electronically disabled. Of course, any functions may be disabled to limit battery use or to safeguard the new vehicle during transportation.

Once the transportation mode is established, the new vehicle 12 is transported from the first location 42 to the second location 46 at Step 90. In the described embodiment, the dealership will determine whether the new vehicle 12 will be used for evaluation purposes for prospective purchasers at Step 92. In other words, the dealership determines whether the new vehicle 12 will be made available for test drives and related demonstrations. If not, then no further action is required as shown at Step 94, i.e., the vehicle mode will not be switched to assembly mode and will remain in transportation mode until the new vehicle computer 26 is paired with a virtual keyfob 14.

If it is determined that the new vehicle will be used for evaluation purposes, then the keyfob 12 will again be used to switch the vehicle mode from the transportation mode back to the assembly mode at Step 96. As indicated above, the assembly mode limits certain functions of the vehicle but is sufficient to allow the new vehicle 12 to be used for evaluation purposes at Step 98. Typically, the dealership uses the dashboard and other vehicle functions not typically used by the vehicle owner to change from the transportation mode to the assembly mode. If the prospective purchaser decides to purchase the new vehicle 12 at Step 100, then the dealership takes steps to unpair the keyfob 10 from the computer 26 of the new vehicle 12. If the prospective purchaser elects not to purchase the new vehicle 12 at Step 100, then the vehicle remains in the assembly mode awaiting a next evaluation by a next prospective customer at Step 98.

In the described embodiment, the step of unpairing the keyfob 10 from the computer 26 of the new vehicle 12 includes pairing the purchaser's virtual keyfob (e.g., a smartphone or similar device) 14 with the computer of the new vehicle at Step 102. At Step 104, the computer 26 verifies information relating to the purchaser's virtual keyfob 14 and forwards certain information to a fourth location, i.e., to a manufacturer of the new vehicle in the described embodiment. Communications between the new vehicle computer 26 and the virtual keyfob 14 are made over a local area wireless network 48 (e.g., a Wi-Fi network) including a transmitter (not shown) associated with the virtual keyfob and a Wi-Fi receiver 50 within the new vehicle. An exemplary communication is shown by dashed line 52.

Figure 4:
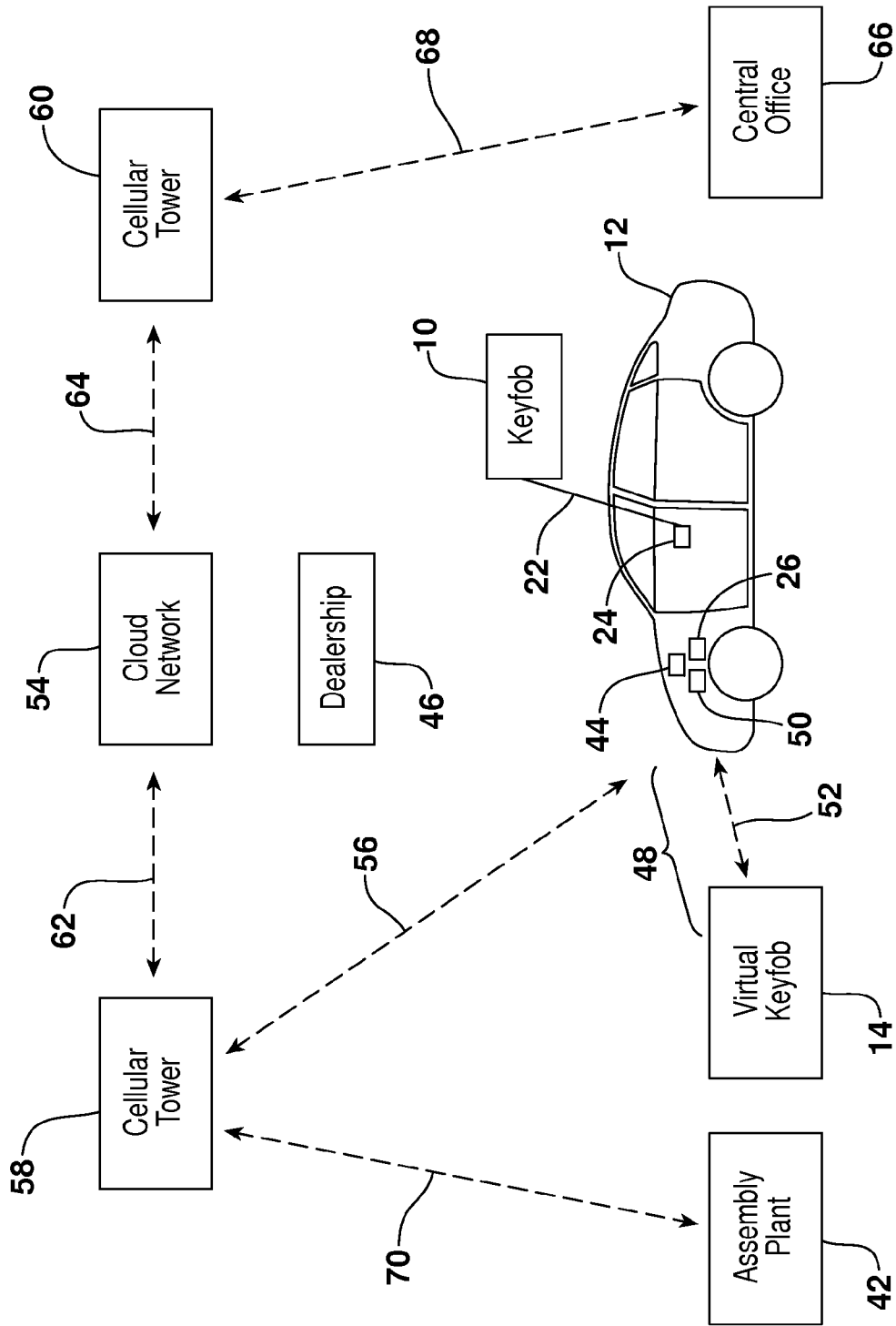
FIG. 4 is an illustration of communication networks associated with the keyfob and virtual keyfob.

As shown in FIG. 4, communications between the new vehicle 12 and the manufacturer are made over a wireless network (e.g., a cellular network and a cloud network) in the described embodiment. More specifically, the wireless network includes a cloud network 54 to pass communications from the new vehicle (shown by dashed line 56) to cellular tower 58, between cellular network towers 58, 60 (shown by dashed lines 62, 64), and to a central office for keyless vehicle operations 66 (shown by dashed line 68) of the manufacturer at the fourth location. Of course, other means of communicating (e.g., strictly using cellular networks, or satellite communications) between the virtual keyfob 14 and new vehicle computer 26 and the manufacturer are possible in alternate embodiments of the present invention.

Even more, the utilization of wireless networks to communicate information concerning the keyfob 10 can be done during the initial pairing of the keyfob to the new vehicle computer 26. For example, identification related information about the keyfob 10 and the new vehicle 12 that the keyfob is being paired to can be sent from the assembly plant 42 to the central office 64. As described above, the information can be sent from the new vehicle 12 (shown by dashed line 56) or from the assembly plant 42 (shown by dashed line 70) over the wireless network including the cloud network 54 and cellular network towers 58, 60.

In this manner, the manufacturer can record which keyfobs are paired with which vehicles throughout the process. This is important in the described embodiment because the keyfob 10 is returned to the assembly plant at Step 106 and re-paired to a second new vehicle at the assembly plant (e.g., at Step 80). In an alternate embodiment, the keyfob is forwarded to a third location and re-paired to a second new vehicle at the third location. In this instance, the third location is a different assembly plant. In other words, the keyfobs are reuseable after being unpaired from the first new vehicle, and later, the second new vehicle in favor of a third and so on.

Upon verification by the computer 26 of information relating to the purchaser's virtual keyfob 14 at Step 104 shown in FIG. 3, authorization is provided by the manufacturer to the computer of the new vehicle 12 to pair the new vehicle computer to the virtual keyfob of the purchaser at Step 108 and the two are paired. In addition, instructions are provided to the computer 26 of the new vehicle 12 to execute an unpairing step, or to delink from the keyfob 10, at Step 110. As a precautionary measure, the keyfob 10 is prevented from being re-paired to the first new vehicle 12 outside of the first location 42, i.e., the assembly plant.

In the described embodiment, the instructions provided further include instructions to switch a mode of the new vehicle 12 from the assembly mode, wherein the vehicle was available for evaluation at the dealership, to a user mode wherein all functions of the new vehicle are available without limitation. This final change in mode occurs at Step 112 after which the new vehicle 12 is completely separated from the keyfob 10 in favor of the virtual keyfob 14. In alternate embodiments, the keyfob 10 could be utilized to switch the new vehicle 12 to the user mode upon pairing of the computer 26 to the purchaser's virtual keyfob 14 or the dealership could utilize the dashboard and other vehicle functions not typically used by the vehicle owner to change from the assembly mode to the user mode.

In summary, numerous benefits result from the method of utilizing a keyfob 10 prior to a sale of a new vehicle 12 to a purchaser having a virtual keyfob 14 are illustrated in this document. The method is capable of providing an inexpensive way for vehicle manufacturers to overcome issues related to the replacement of keyfobs with virtual keyfobs owned by prospective purchasers. In this instance, the provision of a keyfob 10 having limited functionality minimizes overall costs while providing sufficient functionality needed throughout the manufacturing, transportation, and selling processes. For example, the keyfob 10 is paired with a specific new vehicle 21 at the assembly location 42 and unpaired from the new vehicle when the purchasers' virtual keyfob 14 is paired to the new vehicle.

The unpaired keyfob 10 is then returned to the assembly location 42, or a different assembly location, and re-paired with a second new vehicle. Reusing the keyfobs provides a significant cost savings in addition to the reductions in initial expense of the keyfobs due to limited functionality. Even more, the keyfob provides a simple means of switching between desired modes of operation including an assembly mode, a transportation mode, and a user mode throughout the noted processes.

The foregoing has been presented for purposes of illustration and description. It is not intended to be exhaustive or to limit the embodiments to the precise form disclosed. Obvious modifications and variations are possible in light of the above teachings. For example, the key fobs could be utilized with fleet operations in addition to the sale of new vehicles. In such a scenario, a fleet operator could initially pair a keyfob with a desired fleet vehicle for a period of time and then unpair and re-pair the keyfob with a second desired fleet vehicle. The keyfob eliminates the need to have a specified keyfob for each vehicle in the fleet. All such modifications and variations are within the scope of the appended claims when interpreted in accordance with the breadth to which they are fairly, legally and equitably entitled.

What is claimed:

1. A method of utilizing a keyfob prior to a sale of a new vehicle to a purchaser having a virtual keyfob, comprising the steps of:
   pairing a keyfob to a computer of the new vehicle at an assembly plant;
   using said keyfob to switch a mode of the new vehicle between an assembly mode and a transportation mode; and
   unpairing the keyfob from the computer of the new vehicle upon pairing the computer of the new vehicle to the virtual keyfob of the purchaser.

2. The method of utilizing a keyfob prior to a sale of a new vehicle to a purchaser having a virtual keyfob of claim 1, further comprising the step of returning the keyfob to the assembly plant; and pairing the keyfob to a second computer of a second new vehicle at the assembly plant.

3. The method of utilizing a keyfob prior to a sale of a new vehicle to a purchaser having a virtual keyfob of claim 1, wherein the assembly mode limits at least one function of the new vehicle.

4. The method of utilizing a keyfob prior to a sale of a new vehicle to a purchaser having a virtual keyfob of claim 3, wherein the at least one function of the new vehicle limited in the assembly mode includes at least one of a maximum distance the new vehicle can be driven, a maximum speed the new vehicle can be driven, and operability of a remote start feature.

5. The method of utilizing a keyfob prior to a sale of a new vehicle to a purchaser having a virtual keyfob of claim 1, further comprising the step of switching the mode of the new vehicle, prior to shipping the new vehicle to a remote location, from the assembly mode to the transportation mode using the keyfob.

6. The method of utilizing a keyfob prior to a sale of a new vehicle to a purchaser having a virtual keyfob of claim 5, wherein the transportation mode limits at least one function of the new vehicle.

7. The method of utilizing a keyfob prior to a sale of a new vehicle to a purchaser having a virtual keyfob of claim 6, wherein the at least one function of the new vehicle limited in the transportation mode includes at least one of providing power to parking lights and enabling a trunk lid latch.

8. The method of utilizing a keyfob prior to a sale of a new vehicle to a purchaser having a virtual keyfob of claim 5, further comprising the step of switching the mode of the new vehicle, upon arrival of the new vehicle at the remote location, from the transportation mode to the assembly mode using the keyfob.

9. The method of utilizing a keyfob prior to a sale of a new vehicle to a purchaser having a virtual keyfob of claim 1, wherein the step of unpairing the keyfob from the computer of the new vehicle includes the steps of authorizing the pairing of the computer of the new vehicle to the virtual keyfob of the purchaser, pairing the computer of the new vehicle to the virtual keyfob of the purchaser, and providing instructions to the computer of the new vehicle to execute the unpairing step.

10. The method of utilizing a keyfob prior to a sale of a new vehicle to a purchaser having a virtual keyfob of claim 9, wherein the instructions in the step of providing instructions to the computer of the new vehicle include instructions to switch a mode of the new vehicle from the assembly or the transportation mode to a user mode wherein all functions of the new vehicle are available.

11. The method of utilizing a keyfob prior to a sale of a new vehicle to a purchaser having a virtual keyfob of claim 9, wherein the instructions in the step of providing instructions to the computer of the new vehicle are provided from a second remote location to the new vehicle computer via a wireless network, and from the new vehicle computer to the virtual keyfob of the purchaser via a local area wireless network.

12. A method of utilizing a keyfob in association with a new vehicle prior to a purchaser, having a virtual keyfob, taking possession of the new vehicle, comprising the steps of:
  pairing the keyfob to a computer of the new vehicle at a first location;
  transporting the new vehicle and the paired keyfob from the first location to a second location remote from the first location; and
  unpairing the keyfob from the computer of the new vehicle upon pairing the computer of the new vehicle to a virtual keyfob.

13. The method of utilizing a keyfob in association with a new vehicle prior to a purchaser, having a virtual keyfob, taking possession of the new vehicle of claim 12, further comprising the step of returning the keyfob to the first location or to a third location for pairing the keyfob to a second computer of a second new vehicle at the first or the third location.

14. The method of utilizing a keyfob in association with a new vehicle prior to a purchaser, having a virtual keyfob, taking possession of the new vehicle of claim 12, further comprising the step of using said keyfob to switch a mode of the new vehicle between an assembly mode and a transportation mode.

15. The method of utilizing a keyfob in association with a new vehicle prior to a purchaser, having a virtual keyfob, taking possession of the new vehicle of claim 14, wherein the assembly mode limits select functions of the new vehicle.

16. The method of utilizing a keyfob in association with a new vehicle prior to a purchaser, having a virtual keyfob, taking possession of the new vehicle of claim 14, wherein the keyfob is used to switch the mode of the vehicle from the assembly mode to the transportation mode prior to transporting the new vehicle to the second location.

17. The method of utilizing a keyfob in association with a new vehicle prior to a purchaser, having a virtual keyfob, taking possession of the new vehicle of claim 12, wherein the step of unpairing the keyfob from the computer of the new vehicle includes the steps of authorizing the pairing of the computer of the new vehicle to the virtual keyfob of the purchaser, pairing the computer of the new vehicle to the virtual keyfob of the purchaser, and providing instructions to the computer of the new vehicle to delink with the keyfob.

18. The method of utilizing a keyfob in association with a new vehicle prior to a purchaser, having a virtual keyfob, taking possession of the new vehicle of claim 17, wherein the step of providing instructions to the computer of the new vehicle includes instructions to switch a mode of the new vehicle from the assembly or the transportation mode to a user mode wherein all functions of the new vehicle are available.

19. The method of utilizing a keyfob in association with a new vehicle prior to a purchaser, having a virtual keyfob, taking possession of the new vehicle of claim 17, wherein the instructions are provided from a fourth location to the new vehicle computer via a wireless network, and from the new vehicle computer to the virtual keyfob of the purchaser via a local area wireless network.

20. A keyfob for use in association with a new vehicle prior to a purchaser, having a virtual keyfob, taking possession of the new vehicle, comprising:
  a housing containing a power source, and a transmitter;
  a mode select button supported by said housing for selecting a mode of operation of the new vehicle; and
  a processor programmed to pair the keyfob to a computer of the new vehicle at a first location, and unpair the keyfob from the computer of the new vehicle in response to the computer being paired with the virtual keyfob of the purchaser at a second location.

* * * * *